Figure 1:
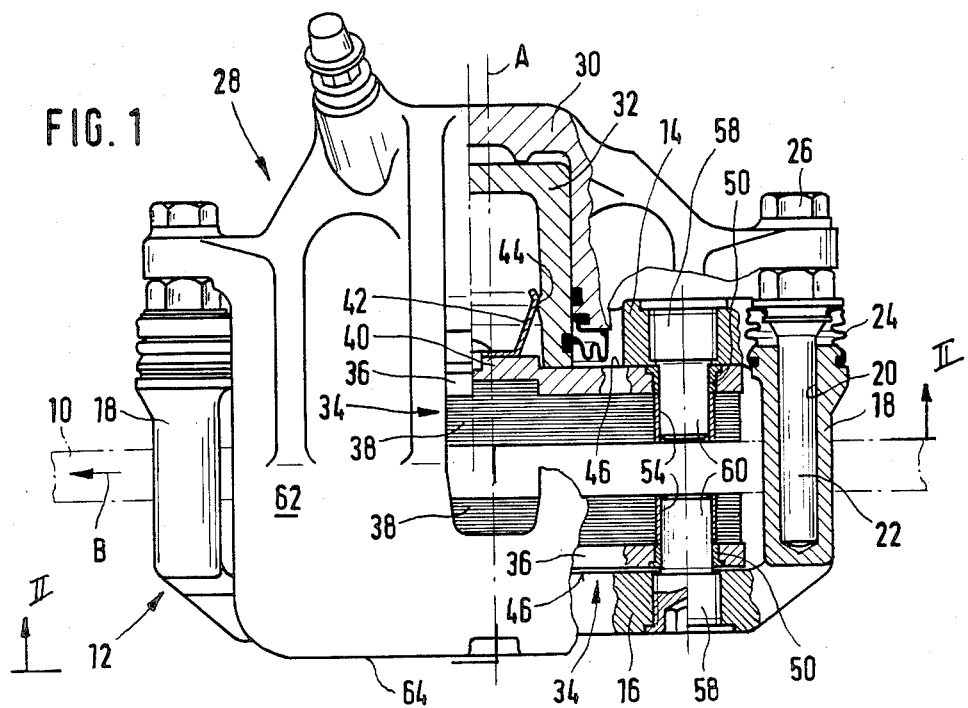

United States Patent [19]

Rath et al.

[11] Patent Number: 4,747,472
[45] Date of Patent: May 31, 1988

[54] BRAKE PAD FOR A DISC BRAKE

[75] Inventors: Heinrich-Bernhard Rath, Vallendar; Ulrich Danne, Bendorf-Sayn, both of Fed. Rep. of Germany

[73] Assignee: Lucas Industries Public Limited Company, Birmingham, England

[21] Appl. No.: 38,248

[22] Filed: Apr. 14, 1987

[30] Foreign Application Priority Data

Apr. 18, 1986 [DE] Fed. Rep. of Germany ... 8610698[U]

[51] Int. Cl.[4] .............................................. F16D 69/00
[52] U.S. Cl. ................................ 188/73.1; 188/218 A
[58] Field of Search .................. 188/1.11, 73.1, 73.36, 188/73.37, 218 A, 250 E, 250 G, 250 B; 192/107 R

[56] References Cited

U.S. PATENT DOCUMENTS

| | | | |
|---|---|---|---|
| 3,119,468 | 1/1964 | Mossey | 188/73.1 X |
| 3,958,445 | 5/1976 | Howard et al. | 188/1.11 X |
| 4,315,563 | 2/1982 | Hayashi et al. | 188/73.1 |

FOREIGN PATENT DOCUMENTS

| | | | |
|---|---|---|---|
| 2644718 | 4/1978 | Fed. Rep. of Germany | 188/73.1 |
| 2471518 | 6/1981 | France | 188/73.1 |

*Primary Examiner*—Duane A. Reger
*Attorney, Agent, or Firm*—Scrivener and Clarke

[57] ABSTRACT

A brake pad (34) has a rear surface (46) for support on an actuating member (32,64) of a disc brake and a braking surface (56) constituted by friction material (38). At least one hole (48) is arranged in the brake pad (34) at right angles with respect to the rear surface (46) to guide the brake pad (34) on a guide pin (60). A protective sleeve (54) for the guide pin (60) extends coaxially with the hole (48) in a direction towards the plane of the braking surface (56). The protective sleeve (54) is made of a material which wears down together with the friction material (38) and it is embedded, at least for part of its length, in the friction material (38).

4 Claims, 1 Drawing Sheet

BRAKE PAD FOR A DISC BRAKE

The instant invention relates to a brake pad for a disc brake, comprising a rear surface to support the brake pad on an actuating member of the disc brake, a braking surface formed by friction material, at least one hole to guide the brake pad on a guide pin of the disc brake which hole is disposed at least approximately at right angles with respect to the rear surface, and a protective sleeve for the guide pin which sleeve extends coaxially with the hole in a direction towards the plane of the braking surface and is made of a material which wears down together with the friction material.

Brake pads of this kind are known (DE-A-No. 3 024 082) with which the friction material is fixed to a backplate which is formed with the rear surface for support on an operating piston. At least at one side the backplate includes a conchal projection which juts out in circumferential direction of the corresponding brake disc and has a hole for a guide pin fastened to a carrier member of the disc brake and passing through the hole as well as a protective sleeve. The protective sleeve either is inserted from the rear surface of the backplate through the hole in the same or it follows the hole in the direction of the brake disc. In both cases the protective sleeve is exposed where it extends away from the conchal projection. The guide pin is protected to a great extent from contamination and corrosion by the protective sleeve. If the brake pad is guided by only one guide pin and consequently includes but one conchal projection, this projection is arranged at the leading side of the brake pad, in other words that end of the brake pad which is reached first by any desired point of the forwardly rotating brake disc.

If the brakes are applied in a vehicle equipped with disc brakes which include the known brake pad described above, on a wet road surface, and a film of water is wiped off the brake disc by the friction material acting on a braking surface and the water collects at the leading end of the brake pad, there is a chance that water will penetrate between the guide pin and the protective sleeve from the front end of the guide pin facing the brake disc. In the course of time this water may cause corrosion at the guide pin. Furthermore, damages of the protective sleeve by broken stone, rendering the same ineffective, cannot be excluded with the known arrangement.

It is, therefore, an object of the instant invention to develop a brake pad destined for guidance on at least one guide pin of a disc brake such that it affords even better protection of the guide pin than before against corrosion and any other damage.

This object is met, in accordance with the invention, with a brake pad of the kind specified initially in that the protective sleeve is embedded at least for part of its length in the friction material.

The friction material which surrounds the protective sleeve largely or totally, keeps away any external mechanical stress from the protective sleeve. For this reason the protective sleeve may be designed to have a thin wall and made of a material which permits the protective sleeve to be in particularly good sealing engagement with the guide pin. The friction material surrounding the protective sleeve affords protection against broken stone and wipes off water which may adhere to the corresponding braking surface before this water can reach the protective sleeve. Consequently it is highly unlikely that water will enter and cause corrosion between the protective sleeve and that part of the guide pin which is enclosed by the same. On the contrary, it may be expected that after only a few braking operations abraded friction material will collect within the protective sleeve enclosed by the friction material in front of the end of the guide pin, forming a more or less tight plug and thus affording additional protection against the penetration of water. In spite of all that, the brake pad requires little space because no lateral projections are needed at the backplate.

The support of the protective sleeve in accordance with the invention by surrounding friction material brings about a preferred embodiment of the invention with which the protective sleeve extends as far as the braking surface even if the friction material still is entirely unused. Frictional forces exerted by the brake disc on the protective sleeve during braking are diverted directly by the protective sleeve to the surrounding friction material and consequently do not subject the protective sleeve to any bending stress. There is still less chance that the protective sleeve will become upset or bent as the brake pad is pressed into contact with the brake disc. For this reason it is absolutely safe that the protective sleeve, from the very beginning, extends as far as the braking surface, provided it is embedded in friction material at least up to the vicinity of the braking surface.

No matter whether the friction material is fixed in conventional manner to a backplate or whether the brake pad substantially is constituted by friction material alone, it is advantageous to have the protective sleeve arranged exclusively in the friction material.

If the invention is applied to a brake pad having a backplate at which the rear surface and the at least one hole are formed and the friction material is secured, an advantageous embodiment of the invention provides for the hole to be lined by a guide bushing made of wear-resistant material which bushing is followed by the protective sleeve. It is an advantage of this embodiment that the protective functions alone of the protective sleeve need be taken into consideration when it comes to the design and material to be used for the protective sleeve, while the task of guiding the brake pad at the corresponding guide pin remains reserved for the guide bushing. Thus the sliding property and the resistance to wear may be the characteristics which are in the foreground in selecting materials for the guide bushing.

Brake pads in accordance with the invention may be used especially advantageously in a disc brake in such manner that two brake pads are designed to be of mirror symmetry and guided opposite each other by a brake support member straddling the brake disc and carrying one each of two guide pins at either side of the disc for guidance of one each of the brake pads. The guide pins preferably are aligned with each other such that also the protective sleeves of the two brake pads will be aligned with each other.

Figure 2:
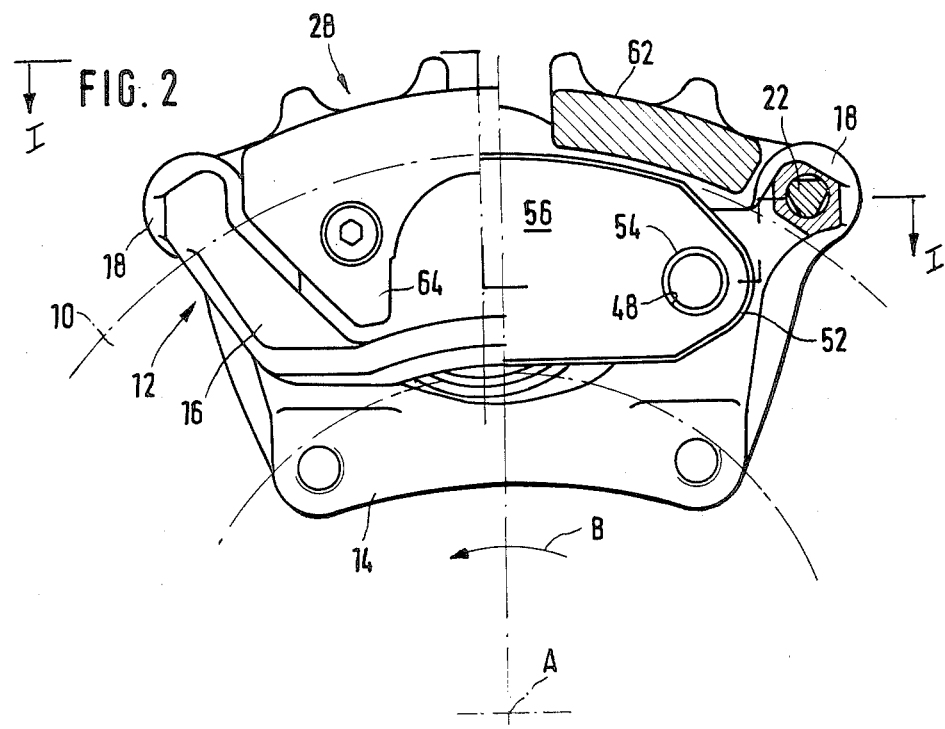

The invention will be described further, by way of example, with reference to the accompanying drawings, in which:

FIG. 1 is a top plan view, partly in section along line I—I of FIG. 2, of a disc brake with brake pads according to the invention; and FIG. 2 is an elevation of the same disc brake, partly in section along line II—II of FIG. 1, as seen from the outer side thereof with respect to the vehicle.

The disc brake shown in FIGS. 1 and 2 is coordinated with a brake disc 10 which is indicated by dash-dot lines and the axis of which is marked A and the direction of rotation upon forward travelling of the corresponding vehicle is marked by arrow B. The disc brake comprises a carrier member 12 including an inner plate 14 and an outer plate 16, in respect of the corresponding vehicle. Both plates 14 and 16 are approximately U-shaped and interconnected by two parallel arms 18 extending slightly spaced to the outside from the outer edge of the brake disc 10 and each being formed with a cylindrical bore 20 in parallel with the axis A and open towards the inner side of the brake with respect to the vehicle. A sliding bolt 22 each is guided in these bores 20 and connected to the corresponding arm 18 by a bellows-type sealing boot 24. A floating caliper 28 is mounted releasably by a threaded bolt 26 each on each of the two sliding bolts 22. The floating caliper 28 straddles the outer edge of the brake disc 10 in the manner of a fist. This type of floating caliper thus is referred to also as fist-type caliper.

At the inner side of the floating caliper 28, with respect to the vehicle, an hydraulic cylinder 30 is formed in which an actuating member is guided which is embodied by a cup-shaped piston 32. The piston 32 is intended for direct actuation of a brake pad 34 the principal components of which are a backplate 36 made of steel and a brake lining secured to the same and made of friction material 38. A circular cylindrical projection 40 is embossed in the center of the backplate 36 for engagement in the piston 32 with little radial clearance. A cross-shaped leaf spring 42 is riveted to the projection 40. The legs of this spring engage behind an annular rib 44 formed at the inside of piston 32 so as to prevent the brake pad 34 from falling out until the brake disc 10 guarantees that it cannot get lost once the brake is installed. Apart from the projection 40, the backplate 36 has a planar rear surface 46 on which rests the annular end face of piston 32.

Close to its leading end the backplate 36 includes a stepped cylindrical hole 48 into which a guide bushing 50 is pressed in a direction from the rear surface 46. The guide bushing 50 may be made, for example, of sintered metal, it has a cylindrical bore, and it is flush with the rear surface 46 as well as the opposed surface of backplate 36 which is totally covered with the brake lining made of friction material 38, with the exception of a narrow margin 52 extending all around. Directly adjacent the guide bushing 50 there is a coaxial protective sleeve 54 which is surrounded all along its length by the friction material 38 and extends as far as the braking surface 56 thereof.

A bolt 58 is threaded into the inner plate 14, with respect to the vehicle, of the carrier member 12 and this bolt comprises a guide pin 60 which protrudes away from plate 14 towards the brake disc 10. The guide pin 60 extends through the guide bushing 50 and into the protective sleeve 54 in which it ends at a small spacing from the brake disc 10. This spacing is just as great or only slightly greater than the usual clearance for release of the brake.

The floating caliper 28 comprises a bridge member 62 which straddles the brake disc 10 and is followed at the outer side with respect to the vehicle of the brake disc 10 by a pair of fingers 64 extending radially inwardly. These fingers 64 support a second brake pad 34 which is operable indirectly by the floating caliper 28 and designed and guided in mirror symmetry with respect to the first brake pad 34 which is operable directly by the piston 32. The details of this second brake pad 34 thus are marked by the same reference numerals indicating the component parts of the first brake pad 34 and its guidance. Thus the second brake pad 34 likewise includes a guide bushing 50 which is pressed into the corresponding backplate 36 close to the leading end thereof and a protective sleeve 54 which is embedded throughout its length in the friction material 38 and reaches as far as the braking surface 56.

With this design the second brake pad 34 is guided for displacement on the carrier member 12 in a manner corresponding to that of the first brake pad 34 but in mirror symmetry and opposite sense with respect to the same. To accomplish that, a bolt 58 is threaded also into the outer plate 16, with respect to the vehicle, of the carrier member 12 and this bolt is aligned with the bolt threaded into plate 14 and comprises a guide pin 60, just like the other bolt.

As the friction material 38 of the brake pads 34 wears down upon braking, the protective sleeves 54 are consumed to the same extent. The brake pads 34 become displaced to the same extent on the guide pins 60, away from the corresponding plate 14 or 16. Thus a cavity each is formed inside the protective sleeves 54 in front of the end of the corresponding guide pin 60. These cavities gradually become filled with dust abraded from the corresponding friction material 38. In this manner the guide pins 60 are protected particularly well against corrosion. At the backside of each brake pad 34 the respective guide pin 60 may be enclosed by a bellows, such as known from DE-A-No. 3 024 082 so that foreign matter which might cause corrosion cannot enter from the backside either.

What is claimed is:
1. A brake pad for a disc brake, comprising
a rear surface (46) to support the brake pad (34) on an actuating member (32, 64) of the disc brake,
a braking surface (56) formed by friction material (38),
at least one hole (48) to guide the brake pad (34) on a guide pin (60) of the disc brake which hole is disposed at least approximately at right angles with respect to the rear surface (46), and
a protective sleeve (54) for the guide pin (60) which sleeve extends coaxially with the hole (48) in a direction towards the plane of the braking surface (56) and is made of a material which wears down together with the friction material (38),
characterized in that the protective sleeve (54) is embedded in the friction material (38) at least for part of its length.

2. The brake pad as claimed in claim 1, characterized in that the protective sleeve (54) extends up to the braking surface (56).

3. The brake pad as claimed in claim 1 or 2, characterized in that the protective sleeve (54) is arranged exclusively in the friction material (38).

4. The brake pad as claimed in claim 3, comprising a backplate (36) at which the rear surface (46) and the at least one hole (48) are formed and the friction material (38) is secured, characterized in that the hole (48) is lined with a guide bushing (50) of wear-resistant material which bushing is followed by the protective sleeve (54).

* * * * *